United States Patent
Izo et al.

(10) Patent No.: US 8,737,817 B1
(45) Date of Patent: May 27, 2014

(54) MUSIC SOUNDTRACK RECOMMENDATION ENGINE FOR VIDEOS

(75) Inventors: Tomas Izo, San Francisco, CA (US); Hrishikesh Aradhye, Santa Clara, CA (US); Bilson Campana, Moreno Valley, CA (US); Gal Chechik, Los Altos, CA (US)

(73) Assignee: Google Inc., Mountain View, CA (US)

( * ) Notice: Subject to any disclaimer, the term of this patent is extended or adjusted under 35 U.S.C. 154(b) by 42 days.

(21) Appl. No.: 13/022,997

(22) Filed: Feb. 8, 2011

(51) Int. Cl.
*H04N 5/76* (2006.01)

(52) U.S. Cl.
USPC .......................................................... 386/287

(58) Field of Classification Search
USPC .......................................... 386/278, 285–287
See application file for complete search history.

(56) References Cited

U.S. PATENT DOCUMENTS

| | | | |
|---|---|---|---|
| 6,067,126 A * | 5/2000 | Alexander ..................... | 348/738 |
| 2008/0154889 A1* | 6/2008 | Pfeiffer ............................. | 707/5 |
| 2009/0119294 A1* | 5/2009 | Purdy et al. ....................... | 707/7 |
| 2009/0299999 A1* | 12/2009 | Loui et al. ......................... | 707/5 |
| 2010/0293048 A1* | 11/2010 | Singolda et al. ............ | 705/14.43 |
| 2011/0081082 A1* | 4/2011 | Jiang et al. ..................... | 382/170 |
| 2012/0114310 A1* | 5/2012 | Hymel et al. .................. | 386/285 |

* cited by examiner

*Primary Examiner* — Thai Tran
*Assistant Examiner* — William Tran
(74) *Attorney, Agent, or Firm* — Fenwick & West LLP (57) ABSTRACT

A system and method provide a soundtrack recommendation service for recommending one or more soundtrack for a video (i.e., a probe video). A feature extractor of the recommendation service extracts a set of content features of the probe video and generates a set of semantic features represented by a signature vector of the probe video. A video search module of the recommendation service is configured to search for a number of video candidates, each of which is semantically similar to the probe video and has an associated soundtrack. A video outlier identification module of the recommendation service identifies video candidates having an atypical use of their soundtracks and ranks the video candidates based on the typicality of their soundtrack usage. A soundtrack recommendation module selects the soundtracks of the top ranked video candidates as the soundtrack recommendations to the probe video.

28 Claims, 5 Drawing Sheets

MUSIC SOUNDTRACK RECOMMENDATION ENGINE FOR VIDEOS

BACKGROUND OF THE INVENTION

Embodiments of the present invention relate generally to video hosting systems, and more particularly to recommending appropriate music soundtracks for videos in a video hosting system.

BACKGROUND

Video hosting services, such as YOUTUBE, allow users to post videos. Some of the user posted videos have music soundtracks. A well-chosen music soundtrack can significantly increase the appeal and entertainment value of a video. For example, a snowboarding video is likely to appear much more exciting when accompanied by a fast-paced music soundtrack (e.g., punk or metal music) than slow romantic music. However, it may be difficult and/or time consuming for content creators, especially amateur videographers, to select appropriate music for their videos without having extensive knowledge of music or cinematography.

An existing system for recommending alternative music soundtracks for videos ranks available soundtracks is based on the musical similarity between an alternative music soundtrack and the original soundtrack of the video. However, such soundtrack recommendations are based on the assumption that the video being evaluated already has a music soundtrack, and this soundtrack is at least generally appropriate in musical style. This conventional soundtrack recommendation scheme does not work for many videos which do not have music soundtracks when posted to a video hosting service.

SUMMARY

A method, system and computer-readable storage medium provide soundtrack recommendations for a video posted to a video hosting service.

One aspect provides a soundtrack recommendation method for a video of a video hosting service. A set of content features are extracted from the video, and used to generate a set of semantic features for the video. The semantic features describe the semantic content of the video, and are represented by a signature vector. A search is performed for a number of video candidates which have similar semantic features. Each of these video candidates already has an associated soundtrack. From this set of semantically similar videos, the video candidates are ranked based on the typicality of their soundtrack usage, that is, whether their soundtracks are more or less similar to the soundtracks of all other videos using the same soundtracks. Based on the rankings of the video candidates, the method selects the soundtracks of the top ranked video candidates, those having soundtracks most typical of the candidates, as the soundtrack recommendations to the probe video.

Another aspect provides a soundtrack recommendation system comprising a non-transitory computer-readable storage medium storing a feature extractor, a video search module, a video outlier identification module and soundtrack recommendation module. The system further comprises a computer processor to execute the computer modules. The feature extractor extracts a set of content features of the probe video and generates a set of semantic features represented by a signature vector of the probe video. The video search module is configured to search for a number of video candidates, each of which is semantically similar to the probe video and has an associated soundtrack. The video outlier identification module identifies video candidates having an atypical use of their soundtracks and ranks the video candidates based on the typicality of their soundtrack usage. The soundtrack recommendation module selects the soundtracks of the top ranked video candidates as the soundtrack recommendations to the probe video.

Still another aspect provides a non-transitory computer-readable storage medium storing executable computer program codes for recommending one or more soundtracks to a video of a video hosting service. The computer-readable medium stores computer program code for extracting a set of content features of the probe video and generates a set of semantic features represented by a signature vector of the probe video. The computer-readable storage medium further comprises computer program code for searching for a number of video candidates, each of which is semantically similar to the probe video and has an associated soundtrack. The computer-readable storage medium further comprises computer program code for identifying video candidates having an atypical use of their soundtracks and ranks the video candidates based on the typicality of their soundtrack usage. The computer-readable storage medium further comprise computer program code for selecting the soundtracks of the top ranked video candidates as the soundtrack recommendations to the probe video based on the rankings of the video candidates.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The figures depict various embodiments of the present invention for purposes of illustration only, and the invention is not limited to these illustrated embodiments. One skilled in the art will readily recognize from the following discussion that alternative embodiments of the structures and methods illustrated herein may be employed without departing from the principles of the invention described herein.

DETAILED DESCRIPTION

Figure 1:
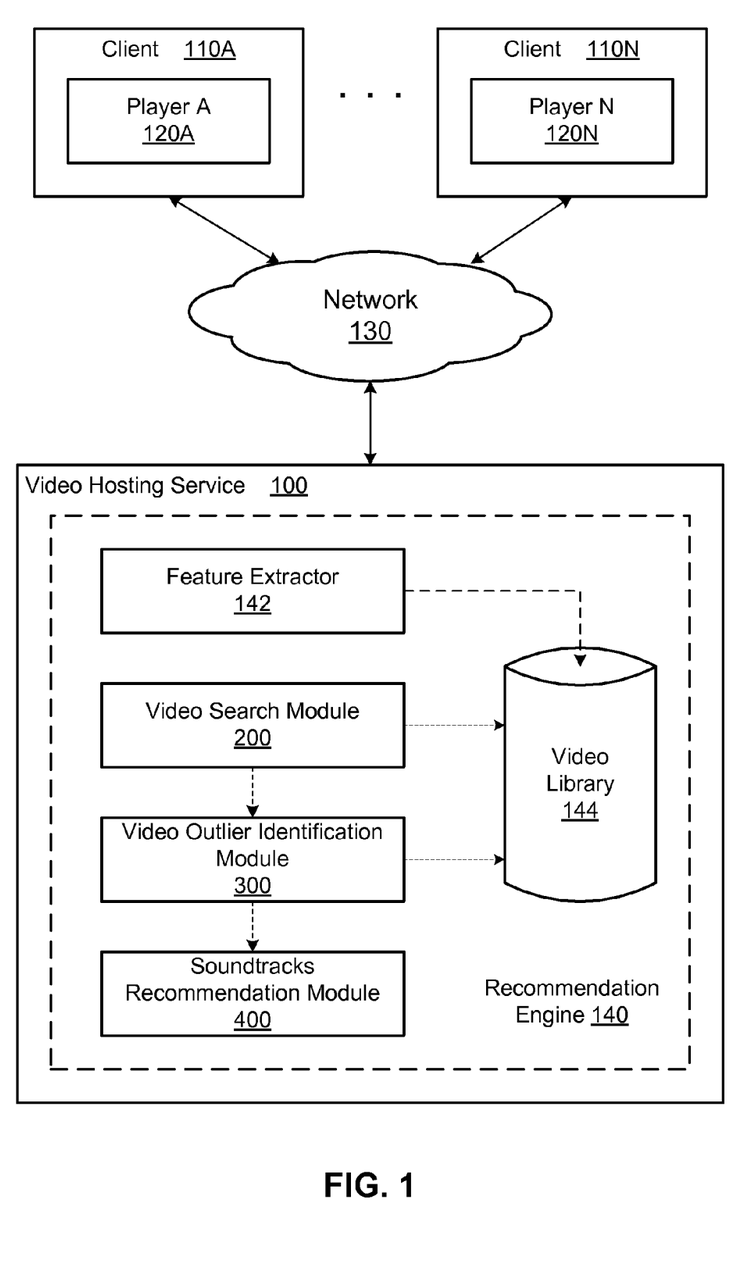
FIG. 1 is a block diagram illustrating a system view of a video hosting service having a soundtrack recommendation engine.

FIG. 1 is a block diagram illustrating a system view of a video hosting service 100 having a soundtrack recommendation engine 140. Multiple users/viewers use clients 110A-N to send videos to the video hosting service 100 for hosting, and receive various services from the video hosting service 100, including soundtrack recommendations. The video hosting service 100 communicates with one or more clients 110A-N via a network 130. The video hosting service 100 can also provide a soundtrack recommendation service, whereby it receives (via an API) requests for soundtrack recommendations from clients 110A-N, determines one or more soundtrack recommendations using the soundtrack recommendation engine 140, and returns the soundtrack recommendations to the clients 110A-N.

Turning to the individual entities illustrated on FIG. 1, each client 110 is used by a user to request video hosting services. For example, a user uses a client 110 to send a request for appropriate soundtracks for a video. The client 110 can be any type of computer device, such as a personal computer (e.g., desktop, notebook, laptop) computer, as well as devices such as a mobile telephone or personal digital assistant that has the capability to record video content. The client 110 typically includes a processor, a display device (or output to a display device), a local storage, such as a hard drive or flash memory device, to which the client 110 stores data used by the user in performing tasks, and a network interface for coupling to the video hosting services 100 via the network 130.

A client 110 also has a video player 120 (e.g., the Flash™ player from Adobe Systems, Inc., or a proprietary one) for playing a video stream. The video player 120 may be a standalone application, or a plug-in to another application such as a network browser. Where the client 110 is a general purpose device (e.g., a desktop computer, mobile phone), the player 120 is typically implemented as software executed by the computer. Where the client 110 is dedicated device (e.g., a dedicated video player), the player 120 may be implemented in hardware, or a combination of hardware and software. All of these implementations are functionally equivalent in regards to the embodiments of the present invention.

The network 130 enables communications between the clients 110 and the video hosting service 100. In one embodiment, the network 130 is the Internet, and uses standardized internetworking communications technologies and protocols, known now or subsequently developed that enable the clients 110 to communicate with the video hosting service 100.

The video hosting service 100 comprises a soundtrack recommendation engine 140. Other embodiments of the video hosting service 100 may include other and/or different computer modules. The soundtrack recommendation engine 140 comprises a feature extractor 142, a video search module 200, a video outlier identification module 300, a soundtracks recommendation module 400 and a video library 144. The feature extractor 142 is configured to receive a source video and extract a set of video content features. The video search module 200 is configured to select a set of videos from the video library 144, which are semantically similar to the source (or "probe") video. The video outlier identification module 300 is configured to identify one or more semantically similar videos that have an atypical use of the soundtrack associated with the videos. The soundtrack recommendation module 400 is configured to select one or more soundtracks from the soundtracks associated with the semantically similar videos based on typicality of soundtrack usage by the semantically similar videos and provide at least one selected soundtrack to user. As a beneficial result, each source video is provided with appropriate soundtrack(s) that increase the appeal and entertainment value of the source video.

Each video uploaded to the video hosting service 100 is processed by a feature pipeline (e.g., the feature extractor 142), which analyzes the video and extracts a set of video content features from the video. The feature extractor 142 extracts video content features of a video after the video is uploaded to the video hosting service 100. The feature extractor 142 further generates video signature vectors from the content features. The video hosting service 100 stores the extracted video content features and video signature vectors in the video library 144.

In one embodiment, the feature extractor 142 extracts a set of video content features from the video content itself. These features can be expressed as vectors of floating point numbers. The feature extractor 142 further applies a plurality of feature classifier models (e.g., 2,000-3,000 classifier models) to the extracted content features to generate semantic features. Each feature classifier model generates a label in the form of <label name, feature score> tuple, which describes how strongly the label for that classifier applies to the video. Together, the set of feature scores of the labels construct a signature vector of the video being processed. The signature vector of a video is further associated with a video identifier of the video such that the signature vector of a video can be retrieved using the video identifier. The set of labels from the feature classifier model describe a set of semantic features of the video.

In one embodiment, each of the plurality of the feature classifier models predicts the likelihood that the video should be tagged with a certain tag, and the likelihood prediction can be represented by a tag likelihood score. The feature extractor 112 aggregates the tag likelihood scores into video category likelihood scores. One way to aggregate the tag likelihood scores is to compute the average score of the tag likelihood scores of semantically related tags. The resulting average score becomes the likelihood score of a video category that comprises the semantically related tags. The feature extractor 112 discovers which video categories are learnable using the video tags and simultaneously associated each of the video categories with a linearly correlated cluster of the feature classifier models. As a result, each of aggregated video categories comprises semantically related tags.

In an example embodiment of discovering the learnable video categories using the video tags generated by the feature classifier models, the feature extractor 112 predicts a number of N video tags (e.g., N=6,000) by applying multiple feature classifier models to a number of M videos (e.g., M=100,000) stored in a video database. The feature extractor 112 computes a N×N covariance matrix C of tag scores and determines a set of tag clusters Q based on the tag scores. The set of tag clusters Q is designed to have the following features: (1) each cluster includes a linearly related set of tags stored in the order to decreasing significance; (2) each cluster is a semantically complete set to the extent possible; and (3) there is minimal semantic overlap between clusters.

The following is an example pseudo code of discovering the set of tag clusters Q using a greedy algorithm:

1) Initialize a pool of available tags P to the complete set of N tags and initialize Q to be empty;
2) Select a tag $t_{seed}$ from a pool of available tags P to as a seed for a new cluster of tags S. $t_{seed}$ is selected as the tag that is most correlated with tags in P. For example, the tag with the highest average covariance with tags in P. Initialize S to $t_{seed}$;
3) Loop over all available tags. For each tag t, construct the covariance matrix for the tags in the set S+t by selecting the appropriate rows and columns of C. If any of the covariances are negative, skip this tag. If not, compute the eigenvalues of this matrix. Compute the ratio r of the largest to the second largest eigenvalue. Select the tag $t_{best}$ which maximizes this ratio. Append $t_{best}$ to S.

4) Repeat step 3 to grow S which $r > r_{min}$, where $r_{min}$ is a predefined parameter;

5) If the number of S is greater than $l_{min}$, add S to the set of tag clusters Q, where $l_{min}$ is a preset threshold on minimum required number of tags in a cluster. Remove the tags in S from P;

6) If P is not empty, repeat steps 2-5.

Given the tag-to-category mapping described above, the feature extractor 112 generates a signature of a predetermined number (e.g., 50-100) of category scores per video, each of which signifies the likelihood that the video belongs to one of the predetermined number of categories. For example, the "/format/slideshow" aggregate classifier is based on the classifiers for a set of terms including "pictures," "photos," "slides," etc. The feature extractor 142 uses the output of these aggregate classifiers, which consists of a set of category level labels and their corresponding feature scores.

Sample categories represented by the category level labels include "vehicles," "winter sports," "racing," or "animations." Examples of the category level labels about "vehicles" include:

/vehicles/car_racing
/vehicles/crashes
/vehicles/extreme_driving
/vehicles/motorcycles
/vehicles/planes
/vehicles/trains.

The features scores corresponding to their feature labels form the video signature vector of a video used for soundtrack recommendations. The category level labels describe a corresponding set of semantic features of the video.

The video library 144 stores videos, soundtracks associated with the videos, video content features and video signature vectors. Each stored video has at least the following information:

Video signature vector (e.g., set of category feature scores);

Soundtrack identification of the soundtrack associated with the video;

Video identifier of the video; and

Centroid of the video signature vectors of all videos that use the same soundtrack. In one embodiment, the video library 144 stores the n-dimensional Euclidean centroid of the n-dimensional feature vectors of all videos that use the same soundtrack. The generation of the centroid will be further described below.

The soundtracks associated with the videos stored in the library can be the original audio content of the videos. The soundtracks associated with the videos can also come from a soundtracks database of the video hosting service 100, where the soundtracks were selected by many uploaders of the videos to replace the original audio content of the videos.

Figure 2:
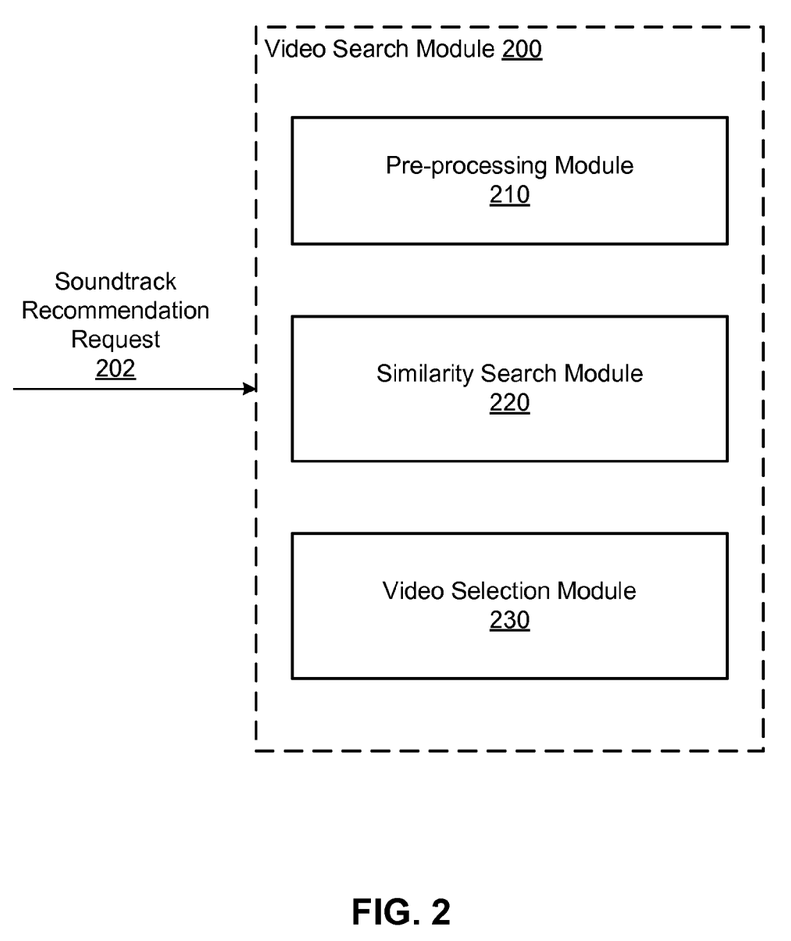
FIG. 2 is a block diagram of a video search module of the soundtrack recommendation engine illustrated in FIG. 1.

FIG. 2 is a block diagram of a video search module 200 of the soundtrack recommendation engine 140 illustrated in FIG. 1. The video search module 200 comprises a pre-processing module 210, a similarity search module 220 and a video selection module 220. The video search module 200 receives a source video and searches for a set of videos from the video library 144 that are semantically similar to the source video of the request. For example, the source video can be the video of a soundtrack recommendation request 202 from a user. Other embodiments of the video search module 200 can include additional and/or different modules from the embodiment illustrated in FIG. 2

The pre-processing module 210 retrieves the video signature vector and/or video content features of the source (or "probe") video of a soundtrack recommendation request from the video library 144. Specifically, the pre-processing module 210 uses the video identifier of the probe video to retrieve the video signature vector associated with the probe video. For example, the pre-processing module 210 uses the video identifier of the probe video to retrieve a set of feature scores, which forms the video signature vector from the video library 144. In cases where no video content features are available for a probe video for retrieval, the pre-processing module 210 calls the feature extractor module 142 to extract the video content features of the probe video.

The pre-processing module 210 calls the similarity search module 220 and provides the video identifier of the probe video. The similarity search module 220 retrieves the video signature vector of the probe video, given its video identifier, and then uses the signature vector to measure the semantic similarity between video candidates stored in the video library 144 and the probe video. This module returns a set of video identifiers of candidate videos that are deemed semantically similar to the probe video. Alternatively, the similarity search module 220 retrieves the content features of the probe video and uses the content features to measure the similarity between video candidates and the probe video in terms of video content.

In one embodiment, the similarity search module 220 measures the similarity between a video candidate and the probe video using a distance function on the video signature vectors of the probe video and the video candidate. The similarity of two signature vectors is inversely proportional to their distance: a larger distance corresponds to a smaller similarity. For purposes of ranking a set of video candidates from the most similar to the least similar, the similarity search module 220 converts a distance measure to a similarity measure by negating the distance measure. To measure the similarity between a video candidate and a probe video, the similarity search module 220 uses one of several similarity or distance measurement schemes. The similarity/distance measurement schemes can include predefined distance or similarity functions over a pair of vectors, such as $L^2$ norm distance in an n-dimensional Euclidean space (where n is the cardinality of the video signature vectors), or a cosine similarity. Cosine similarity is a measure of similarity between two vectors of n dimensions by finding the cosine of the angle between them (the smaller the angle, the larger the similarity). The similarity search module 220 can also use a scalable image similarity measure that is learned from video training data, such as a bilinear similarity measure over sparse representations of a pair of objects (e.g., image objects in a video frame). The choice of the similarity measure schemes used by the similarity search module 220 is configurable (e.g., using a configuration flag). Other embodiments of the similarity search module 220 can use other similarity measure schemes.

To further illustrate the similarity measure by the similarity search module 220, the scalable image similarity measure scheme is described herein. The scalable image similarity measure receives two vectors, v1 and v2 (e.g., video signature vectors), and assigns the video signature vectors a similarity measure represented by s=f(v1, v2), where f( ) is a similarity function that can be learned from video training data a priori. One implementation of f( ) is $f(v1, v2) = v_1^T M v_2$, where M is a linear transformation learned from video examples such that pairs of videos that have higher similarity have a higher f( ) value. For example, if v1 and v2 are known to be more similar to each other than vectors v1 and v3, then the similarity measure described above gives f(v1, v2)>f(v1, v3). The distance of the two vectors v1 and v2 is defined as d(v1, v2)=−s(v1, v2).

The video selection module 230 communicates with the similarity search module 220 to select a set of video candidates based on the similarity measure of the video candidates. The number of the selected video candidates is a design parameter. In one embodiment, the video selection module 230 selects twenty video candidates for a probe video from the video library 144, and the video selection module 230 selects the nearest neighbors of the probe video that are closest (i.e., most similar with the largest f( ) value) to the probe video. Based on the similarity measure, the video selection module 230 ranks the selected video candidates (e.g., from the most similar to the least similar).

Given a set of nearest video candidates, one or more of these videos may have soundtracks that are atypical for these videos comparing with all other videos using the same soundtracks as the video candidates. For example, assume that a source video shows a person snowboarding, and the selected semantically similar videos likewise show snowboarding content. While these candidate videos are semantically similar, at this stage the nature of their soundtracks can vary widely. It may be that most of these videos have rock music soundtracks, but one or more of them have jazz music soundtracks. These would be atypical soundtracks, and as such they would not be desirable for recommending as the soundtrack for the probe video. The video outlier identification module 300 is responsible for identifying these outlier videos.

Turning back to FIG. 1, the video outlier identification module 300 communicates with the video search module 200 to filter out the video candidates that have atypical soundtracks. An atypical soundtrack of a video candidate is measured based on the relative semantic similarity of all other videos using the same soundtrack as the video candidate. In embodiment, the video outlier identification module 300 uses the soundtrack identifier of the soundtrack of a video candidate and then retrieves all the other videos in the library that also use that same soundtrack; this forms a cluster of videos. The module 300 then computes a centroid of the video signature vectors of this cluster of videos. This centroid represents the semantic "center" of these videos.

The soundtrack used by the video candidate can be represented as a cluster of points in the video signature vector space, where each point of the cluster represents a video using the same soundtrack. The typicality of the soundtrack usage in a nearest neighbor match is proportional to how close the match is to the centroid of the soundtrack's cluster. The typicality of a soundtrack usage can be further represented by a typicality score. The lower the typicality score, the closer the video signature is of video candidate is to the centroid, and the more typical the soundtrack is considered to be for this cluster. The module 300 determines a typicality score for each video candidate.

The video outlier identification module 300 re-ranks the video candidates based on the typicality of the soundtrack usages by the video candidates. In one embodiment, the video outlier identification module 300 assigns each video candidate a new ranking score, $r_i$, where $r_i=-\text{distance}(v_i,c_i)$, $v_i$ is the video signature vector of the video candidate and $c_i$ is the centroid of video signature vectors of all other videos using the soundtrack associated with the video candidate. In one embodiment, distance( ) is the n-dimensional Euclidean $L^2$ norm. Alternatively, Mahalanobis distance may be used, which takes into account the covariance matrix of the signature vectors. The distance measure is inversely proportional to the typicality of the soundtrack usages by the video candidates, and so the ranking score reflects the typicality of the soundtrack usage. Responsive to the measured distance exceeding a threshold value, the video outlier identification module 300 determines a video candidate is an outlier and assigns a low ranking value to the video candidate. A high ranking score for a video candidate indicates that the video candidate has a typical use of the soundtrack associated with the video candidate relative to all other videos using the same soundtrack.

The soundtracks recommendation module 400 communicates with the video outlier identification module 300 to generate soundtrack recommendations based on the ranking scores of the video candidates. For example, the soundtrack recommendation module 400 selects top 5 videos from the 20 video candidates based on the ranking scores associated with the video candidates. The number of the selected videos is a configurable design parameter. Each soundtrack associated with the selected videos is a soundtrack recommendation for the probe video. The soundtrack recommendation module 400 sends the soundtrack identifications of the selected soundtracks to client 110 as a response to the soundtrack recommendation request concerning the probe video.

Figure 3:
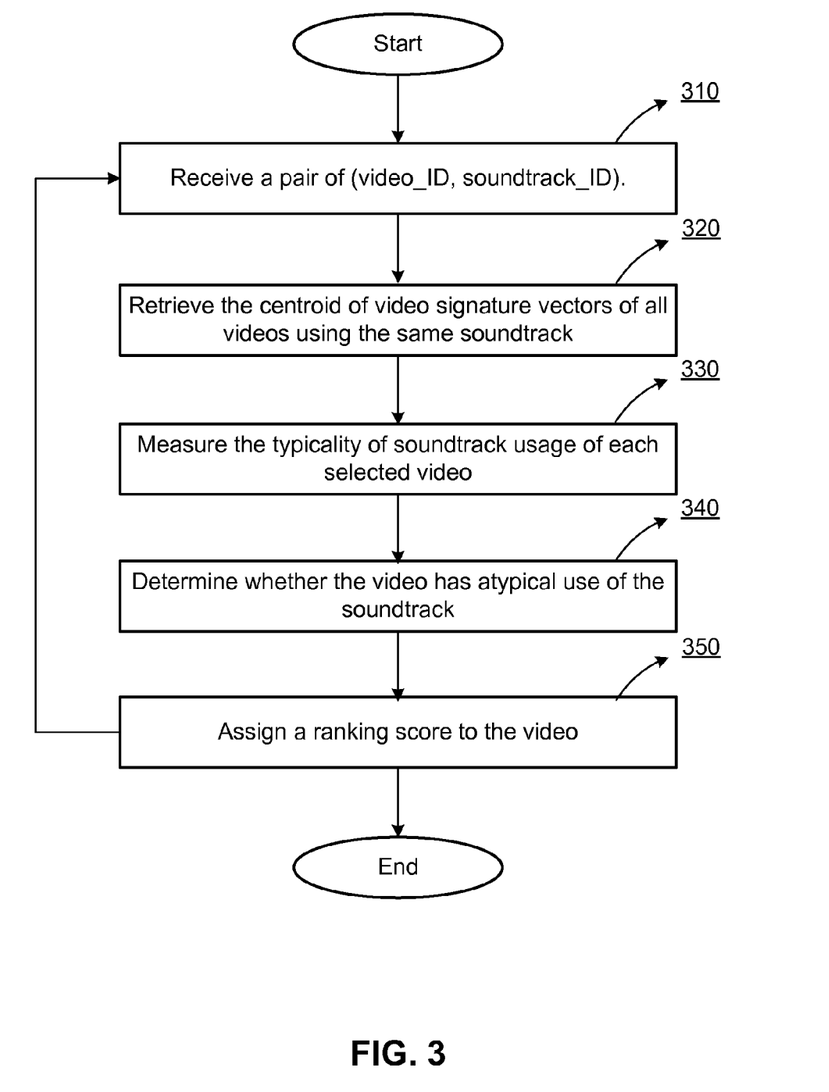
FIG. 3 is a flowchart for ranking selected video candidates based on typicality of soundtrack usages of the video candidates.

FIG. 3 is a flow chart of ranking selected video candidates based on typicality of soundtrack usages of the video candidates. Initially, the recommendation engine 140 receives 310 a tuple (video_ID, soundtrack_ID), where the video_ID is the video identifier of a video candidate selected by the video search module 220, and the soundtrack_ID is the identifier of the soundtrack associate with the selected video candidate. The recommendation engine 140 retrieves 320 the centroid of the video signature vectors of all videos using the same soundtrack identified by the soundtrack_ID from the video library 144. The recommendation engine 140 measures 330 the typicality of the soundtrack usage by the video candidate based on the distance between the video signature vector and the centroid of the video signature vectors of all other videos using the same soundtrack. Based on the measured similarity, the recommendation engine 140 determines 340 whether the video candidate has an atypical use of the soundtrack and assigns 350 a ranking score to the video candidate responsive to the typicality of soundtrack usage. The recommendation engine 140 continues to rank another video candidate using the similar operation steps.

Figure 4:
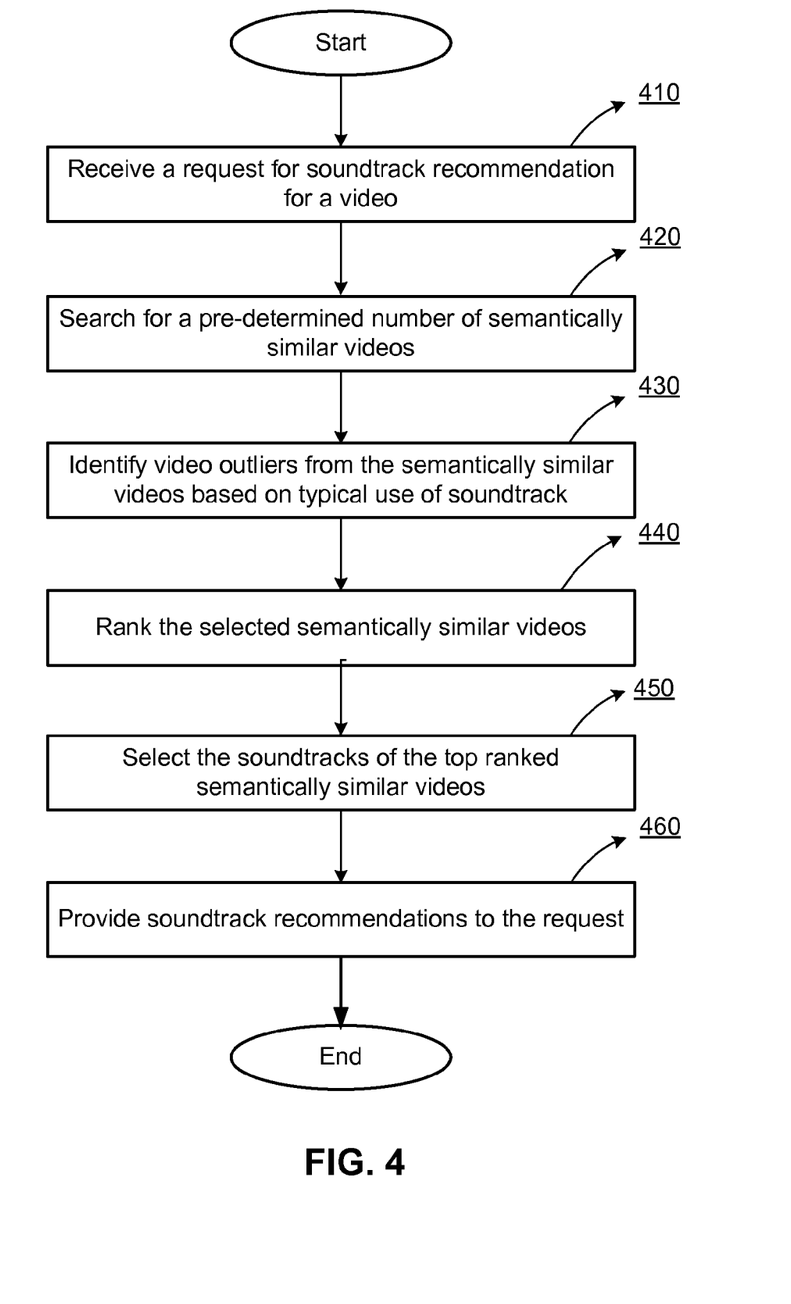
FIG. 4 is a flowchart for recommending soundtracks for a video by the soundtrack recommendation engine.

FIG. 4 is a flow chart of recommending music soundtracks for a probe video by the recommendation engine 140. Initially, the recommendation engine 140 receives 410 a request from a client for soundtrack recommendation of a video (probe video). The recommendation engine 140 searches 420 for a predetermined (e.g., 20) semantically similar videos (or video candidates). Each of the video candidates has an associated soundtrack, which becomes a candidate for one of the recommended soundtracks. Because a video candidate may use the associated soundtrack atypically (e.g., a romantic soundtrack for a snowboarding video), the recommendation engine 140 filters out the selected videos having an atypical soundtrack usage. The recommendation engine 140 identifies 430 one or more selected videos that have an atypical soundtrack usage based on a distance measure between the selected video and all other videos using the same soundtrack. Based on the typicality of the soundtrack usage, the recommendation engine 140 ranks 440 the selected videos. The soundtracks of top 5 videos are selected as the soundtrack recommendations and the recommendation engine 140 provides 460 the selected soundtracks to the client.

A video uploaded to a video hosing service often generated by its author though video editing, such as combining multiple videos into a composite video. A composite video comprises multiple videos and each of the multiple videos is a portion of the composite video. The soundtrack recommendation engine 140 is further configured to recommend one or more soundtracks to these composite videos. For simplicity of describing the soundtrack recommendation engine 140 with composite videos, a video may comprise a composite video and each video contained in the composite video is referred to as a sub-video of the composite video.

Similar to a single video, when a composite video is uploaded to the video hosting service 100 from a client 110, in one embodiment, the feature extractor 142 of the recommendation engine 140 identifies the uploaded video as a composite video, for instance by detecting shot boundaries, and extracts the video content features of each sub-video of the composite video. The feature extractor 142 further generates a video signature vector for each sub-video and stores the video signature vector of each sub-video into the video library 144. In another embodiment, a composite video is created within the video hosting service 100, where an end user edits multiple previously uploaded videos as sub-videos to generate the composite video. For each previously uploaded sub-video, the feature extractor 142 has already extracted and generated its corresponding video signature vector.

The video search module 200 retrieves the video signature vector for each sub-video and searches for a predetermined number of video candidates in the video library 144 for each sub-video based on the video signature vector of the sub-video. Each selected video candidate is semantically similar to the sub-video and the semantic similarity is represented by a matching score. The video search module 200 measures the similarity between a video candidate and the sub-video based on the distance between the video candidate and the sub-video in video signature vector space. The video search module 200 ranks the video candidates based on the matching scores of the video candidates and select a number of video candidates for the sub-video. Each video candidate has an associated soundtrack identified by a soundtrack identification.

For each video candidate of a sub-video, the video outlier identification module 300 determines whether the video candidate has an atypical use of its associated soundtrack with respect to all other videos using the same soundtrack. Based on the typicality of the soundtrack usage, the video outlier identification module 300 re-ranks the video candidates for each sub-video. After processing each sub-video of a composite video similarly, the video outlier identification module 300 globally ranks the video candidates for all sub-videos. The soundtrack recommendation module 400 selects the soundtracks of top-ranked video candidates based on their global rankings among all video candidates for all the sub-videos. The selected soundtracks are the soundtrack recommendations for the composite video and the recommendation module 400 provides the soundtrack recommendations to the client.

Figure 5:
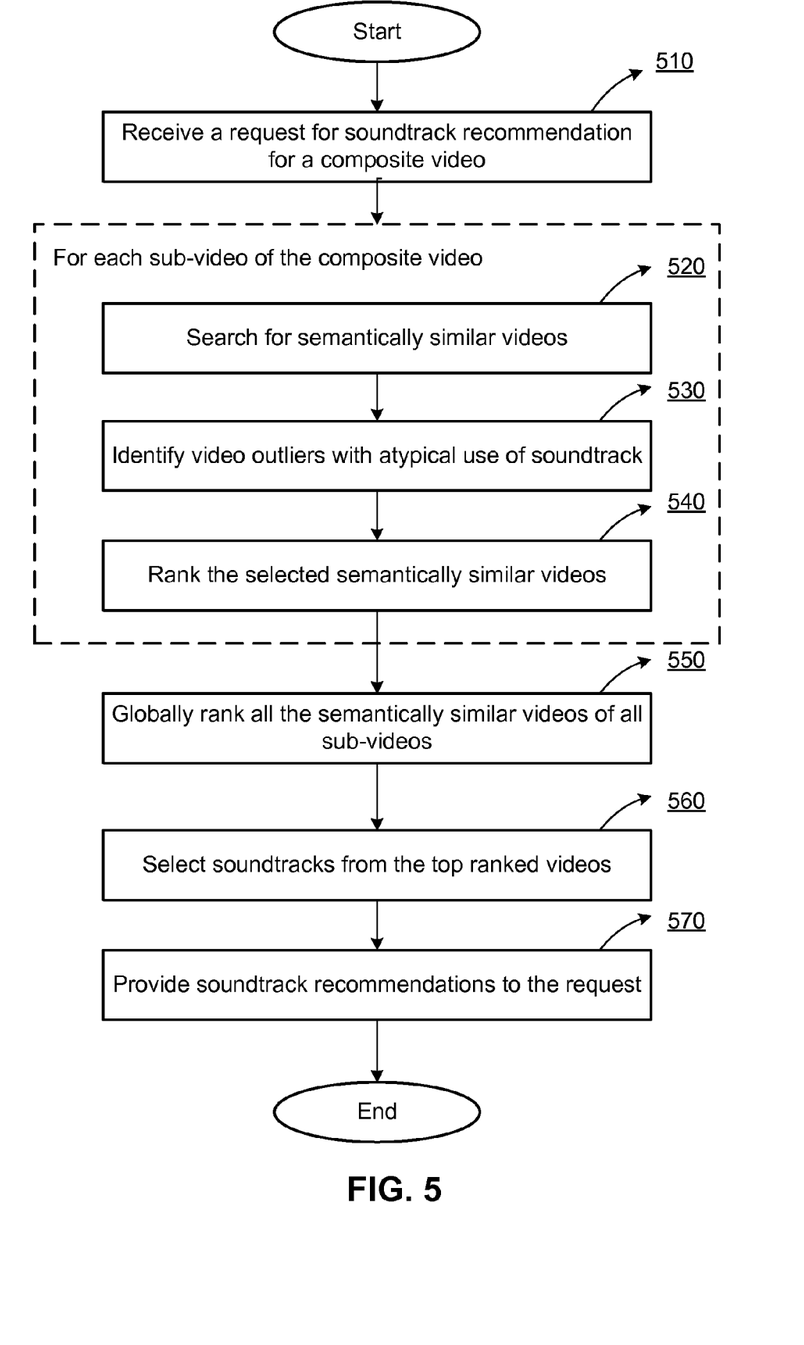
FIG. 5 is a flowchart for recommending soundtracks for a composite video comprising multiple videos by the soundtrack engine.

FIG. 5 is a flow chart of recommending soundtracks for a composite video by the soundtrack recommendation engine 140. The recommendation engine 140 receives 510 a request for soundtrack recommendation for a composite video. For each sub-video of the composite video, the recommendation engine 140 searches 520 for a number of (e.g., 20) semantically similar videos based on the video signatures of the sub-video. The recommendation engine 140 further identifies 530 video candidates having an atypical use of their associated soundtracks. Based on the typicality of the soundtrack usage, the recommendation engine 140 ranks 540 the video candidates of each sub-video.

After processing each sub-video of the composite video, the recommendation engine 140 collects all the video candidates selected for all sub-videos and globally ranks 550 all the video candidates. Based the global ranking of all video candidates, the recommendation engine 140 selects 560 soundtracks of the top ranked video candidates among all video candidates. The selected soundtracks are the soundtrack recommendations for the composite video and the recommendation engine 140 provides 570 the soundtrack recommendations to the client.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The embodiments of the present invention have been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the embodiments of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments of the present invention include process steps and instructions described herein in the form of an algorithm. It should be noted that the process steps and instructions of the embodiments of the present invention could be embodied in software, firmware or hardware, and when embodied in software, could be downloaded to reside on and be operated from different platforms used by real time network operating systems.

The embodiments of the present invention also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will be apparent to those of skill in the, along with equivalent variations. In addition, the embodiments of the present invention are not described with primary to any particular programming language. It is appreciated that a variety of programming languages may be used to implement the teachings of the embodiments of the present invention as described herein, and any reference to specific languages are provided for disclosure of enablement and best mode of the embodiments of the present invention.

The embodiments of the present invention are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments of the present invention is intended to be illustrative, but not limiting, of the scope of the invention, which is set forth in the following claims.

What is claimed is:

1. A method for recommending one or more soundtracks for a source video, the method comprising:
   extracting a set of content features from the source video, the content features including visual features of the source video;
   determining a set of semantic features from the content features of the source video, the semantic features describing one or more topics;
   determining a set of semantically similar videos, each semantically similar video having semantic features similar to the semantic features of the source video, each semantically similar video having an associated soundtrack;
   for each semantically similar video in the set of semantically similar videos:
      identifying an associated soundtrack of the video;
      identifying a plurality of other videos that use the same associated soundtrack; and
      determining a typicality score of the associated soundtrack based on a distance between the semantic features of the video and the semantic features of the identified plurality of other videos using the same associated soundtrack, the typicality score indicating a usage typicality of the soundtrack associated with the video compared against the identified plurality of other videos; and
   selecting the soundtrack of at least one of the semantically similar videos to recommend as a soundtrack for the source video based upon the typicality score of the soundtrack.

2. The method of claim 1, wherein determining a set of semantically similar videos comprises:
   measuring similarity between each semantically similar video and the source video based on comparison of the semantic features associated with the semantically similar video and the semantic features of the source video; and
   ranking the set of semantically similar videos based on their similarity measure.

3. The method of claim 1, wherein determining a set of semantic features from the content features of the source video, the semantic features describing one or more topics, further comprises:
   determining a feature score for each of a plurality of topics to produce a corresponding plurality of feature scores, wherein each feature score is upon the semantic features, and indicates how closely the source video matches the topic, wherein the semantic features for the source video comprise the plurality of feature scores.

4. The method of claim 3, wherein determining a feature score for each of a plurality of topics comprises:
   applying the extracted content features to a classification module, the classification module comprising a learned function that relates content features to semantic features, to produce the plurality of topic scores.

5. The method of claim 1, wherein selecting the soundtrack comprises:
   ranking the semantically similar videos by their typicality scores; and
   selecting the soundtracks from the highest ranking semantically similar videos.

6. The method of claim 1, further comprises selecting a set of videos based on the extracted content feature of the selected video, each selected video having content features similar to the extracted content features of the source video, each selected video having an associated soundtrack.

7. A method for recommending one or more soundtracks for a composite video, the method comprising:
   receiving the composite video, the composite video having a plurality of sub-videos and each sub-video is a portion of the composite video;
   for each sub-video of the composite video:
      extracting a set of content features from the sub-video, the content features including visual features of the sub-video;
      determining a set of semantic features from the content features of the sub-video, the semantic features describing one or more topics;
      determining a set of semantically similar videos, each semantically similar video having semantic features similar to the semantic features of the sub-video, each semantically similar video having an associated soundtrack;
      for each semantically similar video in the set of semantically similar videos:
         identifying an associated soundtrack of the video;
         identifying a plurality of other videos that use the same associated soundtrack; and
         determining a typicality score of the associated soundtrack based on a distance between the semantic features of the video and the semantic features of the identified plurality of other videos using the same associated soundtrack, the typicality score indicating a usage typicality of the soundtrack associated with the video compared against the identified plurality of other videos; and selecting the soundtrack of at least one of the semantically similar videos to recommend as a soundtrack for the source video based on typicality scores of the soundtracks associated with the semantically similar videos.

8. The method of claim 7, further comprising:

ranking the semantically similar videos collected for all sub-videos of the composite video based on the typicality scores of the soundtracks associated with the semantically similar videos; and selecting the soundtracks from the highest ranking semantically similar videos.

9. A non-transitory computer-readable medium storing executable computer program code for recommending one or more soundtracks for a source video, the computer program code comprising code for:

extracting a set of content features from the source video, the content features including visual features of the source video;

determining a set of semantic features from the content features of the source video, the semantic features describing one or more topics;

determining a set of semantically similar videos, each semantically similar video having semantic features similar to the semantic features of the source video, each semantically similar video having an associated soundtrack;

for each semantically similar video in the set of semantically similar videos:
identifying an associated soundtrack of the video;
identifying a plurality of other videos that use the same associated soundtrack; and
determining a typicality score of the associated soundtrack based on a distance between the semantic features of the video and the semantic features of the identified plurality of other videos using the same associated soundtrack, the typicality score indicating a usage typicality of the soundtrack associated with the video compared against the identified plurality of other videos; and selecting the soundtrack of at least one of the semantically similar videos to recommend as a soundtrack for the source video based upon the typicality score of the soundtrack.

10. The computer-readable medium of claim 9, wherein the computer program code for determining a set of semantically similar videos comprises code for:

measuring similarity between each semantically similar video and the source video based on comparison of the semantic features associated with the semantically similar video and the semantic features of the source video; and ranking the set of semantically similar videos based on their similarity measure.

11. The computer-readable medium of claim 9, wherein the computer program code for determining a set of semantic features from the content features of the source video, the semantic features describing one or more topics, further comprises code for:

determining a feature score for each of a plurality of topics to produce a corresponding plurality of feature scores, wherein each feature score is upon the semantic features, and indicates how closely the selected video matches the topic, wherein the semantic features for the selected video comprise the plurality of feature scores.

12. The computer-readable medium of claim 11, wherein the computer program code for determining a feature score for each of a plurality of topics comprises code for:

applying the extracted content features to a classification module, the classification module comprising a learned function that relates content features to semantic features, to produce the plurality of topic scores.

13. The computer-readable medium of claim 9, wherein the computer program code for selecting the soundtrack comprises code for:

ranking each of the semantically similar videos by their typicality scores; and selecting the soundtracks from the highest ranking semantically similar videos.

14. The computer-readable medium of claim 9, further comprises computer program code for selecting a set of videos based on the extracted content feature of the selected video, each selected video having content features similar to the extracted content features of the source video, each selected video having an associated soundtrack.

15. A non-transitory computer-readable medium storing executable computer program code for recommending one or more soundtracks for a composite video, the computer program code comprising code for:

receiving a request from a client for recommending at least one soundtrack for the composite video, the composite video having a plurality of sub-videos and each sub-video is a portion of the composite video;

for each sub-video of the composite video:
extracting a set of content features from the sub-video, the content features including visual features of the sub-video;
determining a set of semantic features from the content features of the sub-video, the semantic features describing one or more topics;
determining a set of semantically similar videos, each semantically similar video having semantic features similar to the semantic features of the sub-video, each semantically similar video having an associated soundtrack;
for each semantically similar video in the set of semantically similar videos:
identifying an associated soundtrack of the video;
identifying a plurality of other videos that use the same associated soundtrack; and
determining a typicality score of the associated soundtrack based on a distance between the semantic features of the video and the semantic features of the identified plurality of other videos using the same associated soundtrack, the typicality score indicating a usage typicality of the soundtrack associated with the video compared against the identified plurality of other videos; and selecting the soundtrack of at least one of the semantically similar videos to recommend as a soundtrack for the composite video based on typicality scores of the soundtracks associated with the semantically similar videos.

16. The computer-readable medium of claim 15, further comprising code for:

ranking the semantically similar videos collected for all sub-videos of the composite video based on the typicality scores of the soundtracks associated with the semantically similar videos; and selecting the soundtracks from the highest ranking semantically similar videos.

17. A system for recommending one or more soundtracks for a source video, the system comprising:
a non-transitory computer-readable storage medium storing executable computer program modules comprising:
a feature extractor for:
extracting a set of content features from the source video, the content features including visual features of the source video; and
determining a set of semantic features from the content features of the source video, the semantic features describing one or more topics;
a video search module for determining a set of semantically similar videos, each semantically similar video having semantic features similar to the semantic features of the source video, each semantically similar video having an associated soundtrack;
a soundtrack recommendation module for:
for each semantically similar video in the set of semantically similar videos:
identifying an associated soundtrack of the video;
identifying a plurality of other videos that use the same associated soundtrack; and
determining a typicality score of the associated soundtrack based on a distance between the semantic features of the video and the semantic features of the identified plurality of other videos using the same associated soundtrack, the typicality score indicating a usage typicality of the soundtrack associated with the video compared against the identified plurality of other videos; and
selecting the soundtrack of at least one of the semantically similar videos to recommend as a soundtrack for the source video based upon the typicality score of the soundtrack; and
a processor for executing the computer program modules.

18. The system of claim 17, wherein the video search module is further for:
measuring similarity between each semantically similar video and the source video based on comparison of the semantic features associated with the semantically similar video and the semantic features of the source video; and
ranking the set of semantically similar videos based on their similarity measure.

19. The system of claim 17, wherein the feature extractor for determining a set of semantic features from the content features of the source video, the semantic features describing one or more topics, is further for:
determining a feature score for each of a plurality of topics to produce a corresponding plurality of feature scores, wherein each feature score is upon the semantic features, and indicates how closely the selected video matches the topic, wherein the semantic features for the selected video comprise the plurality of feature scores.

20. The system of claim 19, wherein the feature extractor is further for:
applying the extracted content features to a classification module, the classification module comprising a learned function that relates content features to semantic features, to produce the plurality of topic scores.

21. The system of claim 17, further comprises a video outlier identification module for:
ranking each of the semantically similar videos by their typicality scores.

22. The system of claim 17, wherein the soundtrack recommendation module is further for selecting the soundtracks from the highest ranking semantically similar videos.

23. The system of claim 17, wherein the feature extractor is further for selecting a set of videos based on the extracted content feature of the source video, each selected video having content features similar to the extracted content features of the source video, each selected video having an associated soundtrack.

24. A method for selecting a sound track for a source video based on a plurality of videos, the method comprising:
extracting a set of content features from the source video, the content features including visual features of the source video;
applying the extracted content features to a plurality of feature classifier models, each of the feature classifier models predicting a likelihood that the source video is tagged with an appropriate video tag, and the predicted likelihood being presented by a tag score; and
determining a plurality of learnable video categories based on the tags associated with the plurality of videos;
associating each of the video categories with a linearly correlated cluster of feature classifier models based on the video category determination;
determining typicality scores for soundtracks associated with the videos in the plurality of learnable video categories, a typicality score indicating a usage typicality of a soundtrack associated with a videos; and
selecting the soundtrack of at least one of the videos in the plurality of learnable video categories to recommend as a soundtrack for the source video based upon the typicality score of the soundtrack.

25. The method of claim 24, wherein applying the extracted features to a plurality of feature classifier models comprises:
computing an average score of the tag likelihood scores of semantically related videos; and
generating a video category likelihood score based on the average score of the tag likelihood scores of semantically related videos.

26. The method of claim 24, wherein determining the plurality of learnable video categories comprises:
determining a set of tag clusters based on the tag scores of the plurality of videos, each cluster of tags comprising tags of videos that are semantically related.

27. The method of claim 26, wherein determining the set of tag clusters comprises:
storing the tags in a cluster in predefined order of significance;
including a number of tags in a cluster that is greater than a predetermined number of tags for the cluster; and
selecting the set of tag clusters that share minimum overlap in semantics between a pair of the clusters of the set of clusters.

28. The method of claim 26, wherein determining the set of tag clusters further comprises:
generating a covariance matrix of tag scores based on the tag scores of the plurality of videos; and computing an eigenvalue ratio of the covariance matrix; and selecting tags from the plurality of the video tags to the set of tag clusters based on the eigenvalue ratio.

* * * * *